Dec. 6, 1927.
R. E. STURMAN
HAY SLING
Filed Nov. 2, 1926
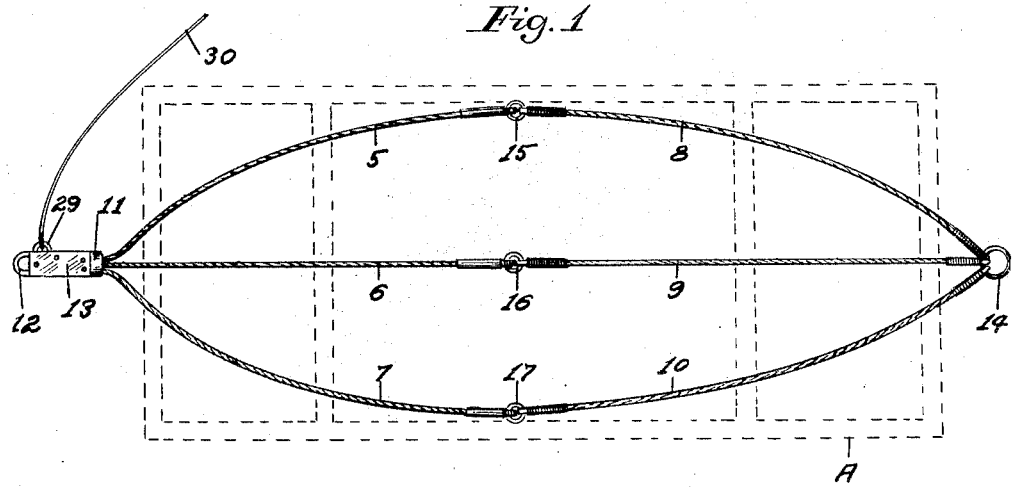
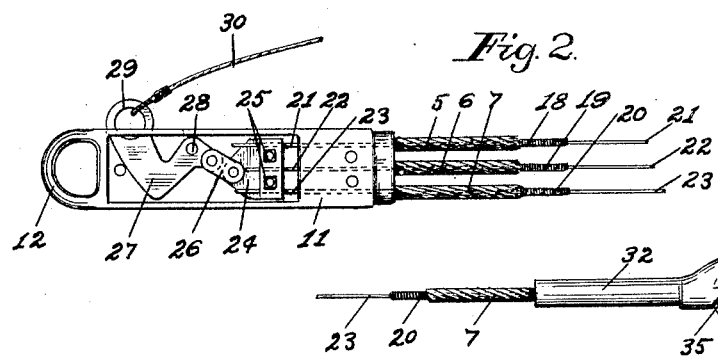
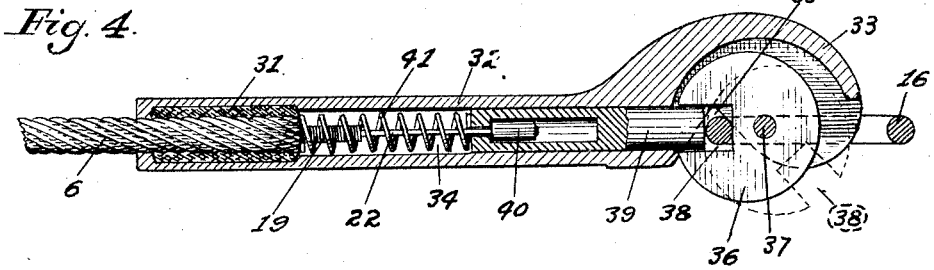
Inventor
ROBERT E. STURMAN
By
Attorney Patented Dec. 6, 1927.

1,651,978

UNITED STATES PATENT OFFICE.

ROBERT E. STURMAN, OF MINNEAPOLIS, MINNESOTA.

HAY SLING.

Application filed November 2, 1926. Serial No. 145,894.

This invention relates to hay slings, and the primary object is to provide means of a novel, practical and efficient nature for gathering into a bundle a predetermined quantity of hay, or the like, raising the bundle from the rack or wagon box, in which it has been loaded, and then tipping the sling, to release the bundle, after it has been elevated and rolled or drawn into the loft of a barn where the hay is to be stored. Further and more specific objects will be disclosed in the course of the following specification, reference being had to the accompanying drawing, in which:

Fig. 1 is a plan view of my improved hay sling, and showing the receiving position it assumes with respect to the wagon or rack which is indicated by dotted lines.

Fig. 2 is an enlarged detail view of the housing, in which are secured cable ends and in which is arranged the tripper lever, the face plate of the housing being removed.

Fig. 3 is an enlarged detail view of the cable joining and releasing device.

Fig. 4 is an enlarged detail view of one of the connecting latches, the major portion of which is shown in central longitudinal section.

Referring to the drawing more particularly and by reference characters, A indicates a hay rack or wagon box in which the hay or feed is loaded and from which the same is to be lifted in bundles by my improved sling.

The sling consists primarily, of six cables 5, 6, 7, 8, 9, and 10, the first three of which are detachable with respect to the last three so as to form two separable sling sections. The outer ends of the cables 5, 6 and 7 are permanently secured in one end of a housing 11 having a loop or eye 12 at its opposite end and having a detachable cover plate 13 to permit access into the housing for purpose of making repairs and adjustments. The cables 8, 9 and 10 are permanently connected, at their outer ends by a ring 14, which ring co-operates with the loop 12 in a manner that will be described hereinafter. The inner ends of the cables 8, 9, and 10 are provided, respectively, with eyes or rings 15, 16, and 17.

It may here be noted that the cables 8, 9, and 10 may be made of rope, wire, or any other suitable material, as may also the cables 5, 6, and 7, but the latter cables are preferably made of twisted wire as this construction lends itself best to the hollow center required in the present instance. Thus the cables 5-7 are shown as made of twisted strands of wire which are wound about a hollow, flexible core consisting of coiled wire or springs 18, 19, and 20, through which operate flexible control wires 21, 22 and 23, respectively. The outer ends of these wires 21, 22 and 23 are all secured to a head 24 by bolts 25 so that they may be adjusted, as to operating lengths, as may be required. The head 24 is slidable, longitudinally within the casing 11, and is actuated by a link 26, which connects it with a bent lever 27, pivoted as at 28 and having a loop 29 to which is attached one end of a long draw string 30, a part only of which is shown.

The inner ends of the cable members 5, 6 and 7, are similarly constructed, and may be described, with reference to Figs. 3 and 4, as follows: The inner cable is permanently secure, as by solder 31, or other suitable means, in the end of a casting 32, having a head 33, and having a cylindrical aperture 34 in alignment with the cable end. The head 33 is provided with a notch 35, to receive the ring 16, and is substantially hollow to contain a latch disc 36, which is eccentrically pivoted as at 37, and has a notch 38 which co-operates with the notch 35 to securely lock the ring 16 in the position shown. The member 36 is releasably held in its locked position by a plunger 39 which is slidable in the cylinder 32. The plunger or piston 39 is substantially hollow and incloses a small head 40 having a limited longitudinal motion within the piston. The head 40 is carried by the wire 22, so that when the wire is pulled, by the trip cord 30, it will release the piston 39 from the recess 38 of the member 36. A spring 41, within the cylinder 32 has a tendency to keep the piston 39 projected, but of course yields to the pull of the wire 22 and only acts, to project the piston, when the trip course is released. The object of slidably securing the head 40, in the piston, is to permit the piston to be retracted, against the tension of the spring 41, without pushing the wire 22 back into the cable.

The use and operation of the device may be described, as follows:

The sling is spread out in the bottom of the rack, about as shown in Fig. 1, and the hay or other matter is then loaded into the rack. With a large rack it is desirable to have several slings and to successively place them, one above the other as the hay is loaded, so that the load may be removed in layers, one at a time, but with a wagon or small rack one sling may be employed to remove the entire load.

When the load is brought up to the barn or other building in which it is to be stored, the rings 12 and 14 are attached to and caught up by the hooks or ropes of the hoisting mechanism (not shown) and drawn upwardly toward each other. This action rolls or gathers the load into a tight bundle, in which condition it is conveyed to the desired position in the loft, at which time the trip rope 30 is pulled, releasing the rings 15, 16, and 17, to open the sling and drop the load. It will be noted that the inner ends of the cables 5–10 are free to escape, and the trip rope 30, located as it is, above the load, will also be free, and will not be buried by the load as is the case where trip ropes are connected with under parts of the sling.

As the cables are separated they leave the members 36 in the position shown by dotted lines, in Fig. 4 and to re-unite them it is only necessary to re-engage the ring 16 (15 and 17) in the notch 38, and by it rotate the member 36 back to its initial position, where it will be reengaged by the piston 39. It may here be noted that in case a pull wire 21—23 breaks, it can easily be replaced by releasing one end from the head 24, and by punching out the rivet 37 and removing the member 36 to permit the removal of the piston 39 and the wire connected with it.

It is understood that suitable modifications may be made in the general design and structural details of the invention as herein shown and described, provided, however, that said modifications come within the spirit and scope of the appended claims.

Having now therefore fully shown and described my invention, what I claim to be new and desire to protect by Letters Patent is:

1. A sling comprising a pair of separable sections one of which has a series of tubular cables, latches connecting the sections, pull wires extending through the respective cables, so as to be housed thereby, for opening the latches, and means for simultaneously pulling said pull wires.

2. A sling comprising a pair of separable sections one of which has a series of tubular cables, latches connecting the sections, pull wires extending through the respective cables, so as to be housed thereby, for opening the latches, and means for simultaneously pulling said pull wires, said means comprising a movable member at one end of the sling, and a trip cord connected with the member.

3. A sling comprising a pair of separable sections one of which has a series of tubular cables, latches connecting the sections, pull wires extending through the interiors of said cables for opening the latches, and means for simultaneously pulling said pull wires, said means comprising a movable member at one end of the sling, means for securing the outer ends of the wires to said member, and means for moving the member.

4. A sling comprising a pair of separable sections one of which has a series of tubular cables, latches connecting the sections, pull wires extending through the interiors of said cables for opening the latches, and means for simultaneously pulling said pull wires, said means comprising a movable member at one end of the sling, means for adjustably securing all of the pull wires to said member, and a trip cord for moving the member.

5. A sling comprising separable sections, latches for releasably securing the sections together, latch releasing pull wires extending through respective tubular portions of one of the sections and to its outer end, and a tripping mechanism at said outer end for simultaneously pulling all of said wires.

6. A sling comprising two series of cables, latch members for releasably connecting the inner ends of the cables, pull wires extending through and contained inside certain of the cables for releasing said latches, and means for actuating the pull wires.

7. A sling comprising two series of cables, latch members for releasably connecting the inner ends of the cables, pull wires extending through tubular centers in certain of the cables, so as to be contained therewithin, for releasing said latches, and means for actuating the pull wires, said means including a lever and a trip cord.

8. A sling comprising two series of cables, the inner ends of the cables of one section being provided with rings, and the inner ends of the cables of the other section being provided with latches for engaging said rings, and pull wires extending from said latches through the interiors of certain of said cables and to the outer end of said other section and operable therefrom to release said latches from the rings, each of said latches having a lateral recess to receive a ring and releasable means for locking the ring in the recess.

9. A sling comprising two series of cables, the inner ends of the cables of one section being provided with rings, and the inner ends of the cables of the other section being provided with latches for engaging said rings, and pull wires extending from said latches through the interiors of certain of said cables and to the outer end of said other sections and operable therefrom to release said latches from the rings, each of said latches having a lateral recess to receive a ring and a rotatable member having a notch to co-operate with said recess to releasably lock the ring therein.

10. A sling comprising two series of cables, latch members for releasably connecting the inner ends of the cables, pull wires extending through so as to be housed within certain of the cables for releasing said latches, means for adjusting the operative lengths of said pull wires, and means for actuating the pull wires.

11. A sling comprising two series of cables, latch members for releasably connecting the inner ends of the cables, pull wires extending through so as to be housed within certain of the cables for releasing said latches, means for adjusting the operative lengths of said pull wires, and means for actuating the pull wires from the outer end of the sling.

In testimony whereof I affix my signature.

ROBERT E. STURMAN.